(12) United States Patent
Miller

(10) Patent No.: US 12,480,584 B1
(45) Date of Patent: Nov. 25, 2025

(54) CLEAN-IN-PLACE SHUTTER VALVE

(71) Applicant: Gabriel Max Miller, Lodi, WI (US)

(72) Inventor: Gabriel Max Miller, Lodi, WI (US)

( * ) Notice: Subject to any disclaimer, the term of this patent is extended or adjusted under 35 U.S.C. 154(b) by 0 days.

(21) Appl. No.: 18/965,423

(22) Filed: Dec. 2, 2024

(51) Int. Cl.
    *F16K 5/06*     (2006.01)

(52) U.S. Cl.
    CPC .......... *F16K 5/0605* (2013.01); *F16K 5/0689* (2013.01); *F16K 5/0694* (2013.01); *F16K 2200/402* (2021.08)

(58) Field of Classification Search
    CPC .... F16K 5/0605; F16K 5/0689; F16K 5/0694; F16K 2200/402
    USPC ........................................ 251/315.01–315.16
    See application file for complete search history.

(56) References Cited

U.S. PATENT DOCUMENTS

| | | | | |
|---|---|---|---|---|
| 2,076,841 A * | 4/1937 | Heggem | ................. | F16K 5/204 251/164 |
| 3,067,978 A * | 12/1962 | Natho | ................... | F16K 5/0668 251/315.08 |
| 3,109,623 A * | 11/1963 | Bryant | ................. | F16K 5/0673 251/327 |
| 3,410,523 A * | 11/1968 | Kelly | ....................... | F16K 25/04 251/315.08 |
| 4,566,482 A * | 1/1986 | Stunkard | ............... | F16K 5/0636 251/315.08 |
| 4,749,002 A * | 6/1988 | Lembser | ................. | F16K 25/02 251/315.1 |
| 4,936,547 A * | 6/1990 | Obst | ....................... | F16K 5/204 251/315.11 |
| 5,181,539 A * | 1/1993 | Yokoyama | ................ | F16K 5/06 251/315.04 |
| 5,482,253 A * | 1/1996 | Klyde | ..................... | F16K 5/204 251/317.01 |
| 6,485,000 B1 * | 11/2002 | Klyde | ..................... | F16K 5/204 251/315.1 |
| 2004/0069968 A1 * | 4/2004 | Gillen | ................... | F16K 5/0642 251/315.14 |
| 2011/0309280 A1 * | 12/2011 | Wincek | ................. | F16K 5/0605 251/315.01 |
| 2015/0285383 A1 * | 10/2015 | Stumbo | ................... | F16K 1/446 137/1 |

* cited by examiner

*Primary Examiner* — John Bastianelli
(74) *Attorney, Agent, or Firm* — Joseph T. Leone; DeWitt LLP

(57) ABSTRACT

A clean-in-place shutter valve having a valve shutter with a full aperture and at least one shutter seal disposed between an outer surface of the valve shutter and the valve housing that retains the shutter, such that together the shutter seal, the outer surface of the valve shutter, and the housing define a cavity that is accessible to liquid passing through the valve when the valve shutter is in a first, open position, and is inaccessible to liquid when the valve shutter is in the second, closed position. The cavity is accessible to cleaning solutions and thus enables the valve to be thoroughly cleaned in place without disassembly. Further, the cavity is open to process fluids, and thus enables the valves to operate in the open position without stagnant fluids.

9 Claims, 10 Drawing Sheets

CLEAN-IN-PLACE SHUTTER VALVE

BACKGROUND

Systems for transporting and processing liquids in a processing plant or chemical reactor are highly varied and depend on many factors. Fundamentally, though, the two most basic factors are the material being processed and the manipulations and/or reactions that are to be performed on the material. Thus, for example, liquid handling equipment can be as seemingly straightforward as packaging equipment for juice, soda, beer, liquor, etc. The complexity of the machinery, though, is increased as functionality is added—such as when pasteurizing milk immediately prior to its being packaged, or separating egg yolks from egg whites—with distinct, downstream manipulations for the whites versus the yolks. Complexity rises further when multi-step processes are performed at production scale using liquid starting materials. For example, the liquid reactants and needed catalysts must be brought together under carefully controlled conditions, the desired product then separated from undesired by-products or unreacted starting materials, perhaps recycling unreacted starting materials back into the process and passing the desired product or intermediate to another reactor for further processing.

Liquid-handling systems of virtually all types, but especially liquid food-handling systems and pharmaceutical manufacturing systems, require a thorough cleaning after each batch or run. In most jurisdictions, routine cleaning, on a mandated time schedule, using a validated cleaning protocol is required by law. These requirements often represent a considerable cost of operation for the manufacturer. Disassembling a vast array of conduits, valves, holding tanks, reactors, mixers, heat exchangers, pumps, freezers, fillers, and other processing equipment to clean them is a massively time-consuming and labor-intensive task. Insofar as time is money, the amount of downtime spent cleaning the equipment is time that is not used profitably in making product for sale. Accordingly, clean-in-place components have been introduced to minimize disassembly of the processing equipment.

There is also an all-encompassing public health aspect to the ability to clean and sterilize the equipment and to validate the reproducibility of the cleaning protocols. In short, releasing one or more lots of contaminated food or contaminated pharmaceutical product into the stream of commerce can have catastrophic, even fatal, results. (For example, in late 2008 and early 2009, a peanut butter manufacturer shipped several lots of *salmonella*-contaminated product. More than 700 people were made seriously ill and nine died.) Even if the contamination is discovered quickly and prior to any harm to the public, product recalls are hugely expensive and hugely damaging to the manufacturer's reputation.

Additionally, in some processes, it is desirable to recover products remaining in the piping system, prior to cleaning, for further processing to minimize the loss of product and the environmental impact of product sent to the system drain. To recover the product in the pipeline, a projectile is sent through the process piping that requires components with uniform internal dimensions to allow the projectile pass through the pipeline unimpeded.

At their most straightforward, clean-in-place ("CIP") systems are dimensioned and configured to deliver cleaning solutions throughout the entire system, without disassembling the equipment. A rinse solution is then passed through the system to remove the cleaning solutions from the equipment. This is all done without disassembling of the system. The equipment is then ready to process the next batch of materials. CIP systems experience far less down-time for cleaning as compared to analogous, clean-out-of-place ("COP") systems.

A cleaning problem can have enormous consequences to public health and the continued economic viability of the company having the problem. Insufficient cleaning protocols can lead to the sale of tainted products-such as contaminated drugs or foods containing harmful pathogens such as *Listeria*. The list is long of companies that have been shuttered by public health authorities such as the U.S. Food and Drug Administration, the U.S. Department of Agriculture, and others.

Public health risk is evidenced by the number of illnesses and deaths caused by food borne pathogen contaminations. Regulatory risk includes possible removal of authorization. Economical risk involves production delays, product recalls, and stock shortages or losses but also manifest as public relations problems for a company.

A ball valve is a flow control device which uses a pivoting ball, snuggly fit within a housing, to control fluid flowing through the valve. The ball has an aperture passing through it of a similar diameter to the piping system, allowing a product recovery projectile to pass through it unimpeded. The valve is thus open when the aperture passing through the ball is positioned in the housing so that the aperture is in line with the inlet and outlet in the housing. Liquid enters the valve through the inlet in the housing, passes through the aperture in the ball, and exits the outlet in the housing. By pivoted the ball (by 90 degrees in a straight line ball valve) the inlet and outlet of the housing are blocked by the ball; the valve is closed because the ball blocks fluid flow. Ball valves are durable and reliable. Because they close securely, even after long periods of disuse, they are used extensively for shutoff valves.

Notably, the ball valves present in liquid-handling systems are particularly difficult to clean using CIP architecture. This difficulty is inherent in the nature of valves themselves. Every type of valve includes a seat of some sort and a stopper that is urged against the seat (by various mechanisms) to close the valve. The stopper itself requires a mechanism to move it between the open and closed position. It has been found that contaminants can collect in the small areas surrounding the valve seat and stopper. These small areas are not easily reached by CIP solutions and thus contaminants are not completely removed by the cleaning fluid. If that's the case, there is no alternative but to disassemble the valve to clean it in earnest.

The ball, however, must be turned by some means. In automated systems, the ball is turned by at least one drive stem disposed at one pole of the axis of rotation of the ball. The drive stem(s) is manually operated or connected to an actuator that automatically opens or closes the valve by rotating the ball between the open and closed positions. A cavity is formed between the housing and the ball and between the ball, the housing, and the drive stem(s) so that the ball can rotate between the open and closed positions. These spaces create problems for clean-in-place systems that use ball valves because it is hard to get the cleaning and rinsing solutions into these spaces.

Further, when a ball valve is open during processing, product is trapped in the cavity formed between the housing and the ball. This product is stagnant and microorganisms can proliferate, creating a risk of microbial contamination.

Thus, there is a long-felt and unmet need for a valve with a full aperture that robustly moves between open and closed positions, but which can be thoroughly cleaned in place, and which has no cavity with stagnant product during processing.

SUMMARY OF THE INVENTION

Disclosed herein is a shutter valve comprising:
a housing defining a chamber having an inlet and an outlet;
a valve shutter having an outer surface and disposed within chamber of the housing and movable between a first, open position wherein product can enter the inlet and exit the outlet, and a second, closed position wherein product cannot enter the inlet or exit the outlet; and
at least one shutter seal disposed between the outer surface of the valve shutter and the housing, such that together the shutter seal, the outer surface of the valve shutter, and the housing define a cavity that is accessible to liquid passing through the valve when the valve shutter is in the first, open position, and is inaccessible to liquid when the valve shutter is in the second, closed position.

In a first version of the shutter valve, the housing comprises a valve body sandwiched between two end caps to define the chamber that holds the valve shutter. In a second version of the shutter valve, the housing comprises two valve bodies operationally connected in face-to-face orientation to define the chamber. The two valve bodies may optionally be bilaterally symmetrical.

The shutter valve as described herein, wherein the valve shutter is rotationally affixed within the chamber of the housing by at least one valve stem attached to the valve shutter.

The shutter valve as described herein, wherein the valve shutter is rotationally affixed within the chamber of the housing by two valve stems attached to the valve shutter.

The shutter valve as described herein, wherein the at least one valve stem extends through an aperture in the housing and further comprises at least one corresponding stem seal and cooperating stem bushing disposed around the at least one valve stem.

The shutter valve as described herein, wherein the valve shutter is in the shape of a truncated sphere having two, parallel spherical caps removed, thereby defining two parallel faces, and defines an aperture passing through the two parallel faces.

The shutter valve as described herein, wherein when the valve shutter is in the first, open position, the two parallel faces do not contact the at least one shutter seal.

The shutter valve as described herein, wherein when the valve shutter is in the second, closed position, the outer surface of the valve shutter is urged against and defines a liquid tight seal against the at least one shutter seal.

The shutter valve as described herein, wherein the housing comprises two bilaterally symmetrical valve bodies operationally connected in face-to-face orientation to define the chamber.

The shutter valve as described in the immediately preceding paragraph, wherein the valve shutter is rotationally affixed within the chamber of the housing by at least one valve stem attached to the valve shutter.

The shutter valve as described herein, wherein the valve shutter is rotationally affixed within the chamber of the housing by two valve stems attached to the valve shutter.

The shutter valve as described herein, wherein the at least one valve stem extends through an aperture in the housing and further comprises at least one corresponding stem seal and cooperating stem bushing disposed around the at least one valve stem.

The shutter valve as described herein, wherein the valve shutter is in the shape of a truncated sphere having two, parallel spherical caps removed, thereby defining two parallel faces, and defines an aperture passing through the two parallel faces.

The shutter valve as described herein, wherein when the valve shutter is in the first, open position, the two parallel faces do not contact the at least one shutter seal.

The shutter valve as described in the immediately preceding paragraph, wherein when the valve shutter is in the second, closed position, the outer surface of the valve shutter is urged against and defines a liquid tight seal against the at least one shutter seal.

The shutter valve as described herein, wherein the aperture of the valve is approximately the same diameter of the connecting piping, to permit the unimpeded passage of a product recovery projectile.

ABBREVIATIONS AND DEFINITIONS

All references to singular characteristics or limitations of the disclosed shutter valve shall include the corresponding plural characteristic or limitation, and vice-versa, unless otherwise specified or clearly implied to the contrary by the context in which the reference is made. The indefinite articles "a" and "an" mean "one or more."

All combinations of method steps disclosed herein can be performed in any order, unless otherwise specified or clearly implied to the contrary by the context in which the referenced combination is made.

The shutter valve disclosed herein can comprise, consist of, or consist essentially of the essential elements described herein, as well as any additional or optional elements, components, or limitations described herein or otherwise useful in liquid handling equipment.

The word "or" is used inclusively and means "and/or."

DETAILED DESCRIPTION OF THE INVENTION

Figure 1A:
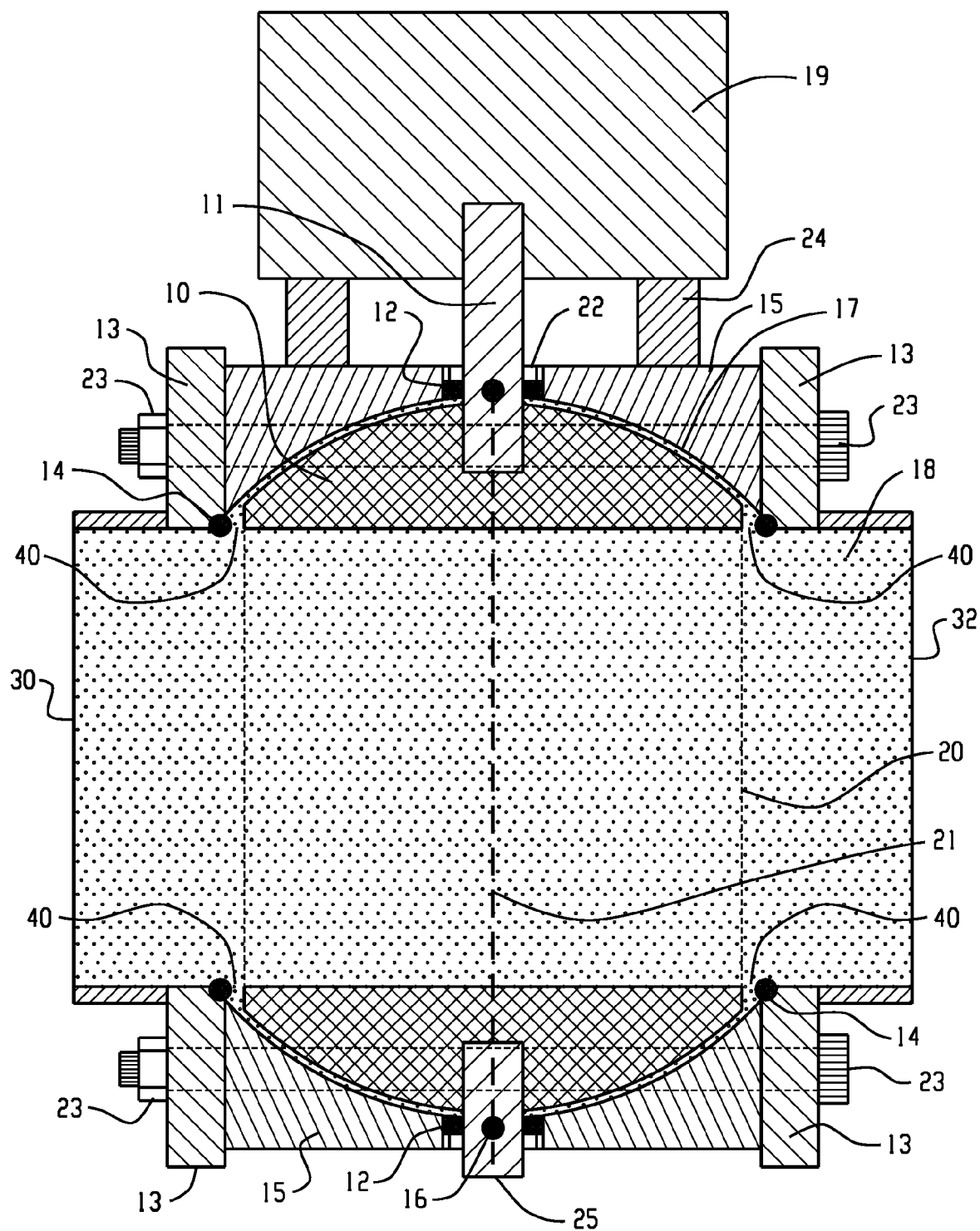
FIG. 1A is front elevation view of a first version of the subject shutter valve in the open position.

Newly developed and disclosed herein is a shutter valve capable of being thoroughly cleaned in place without extensive disassembly.

The same reference numerals are used throughout the figures to identify the same (or analogous) elements.

Figure 1B:
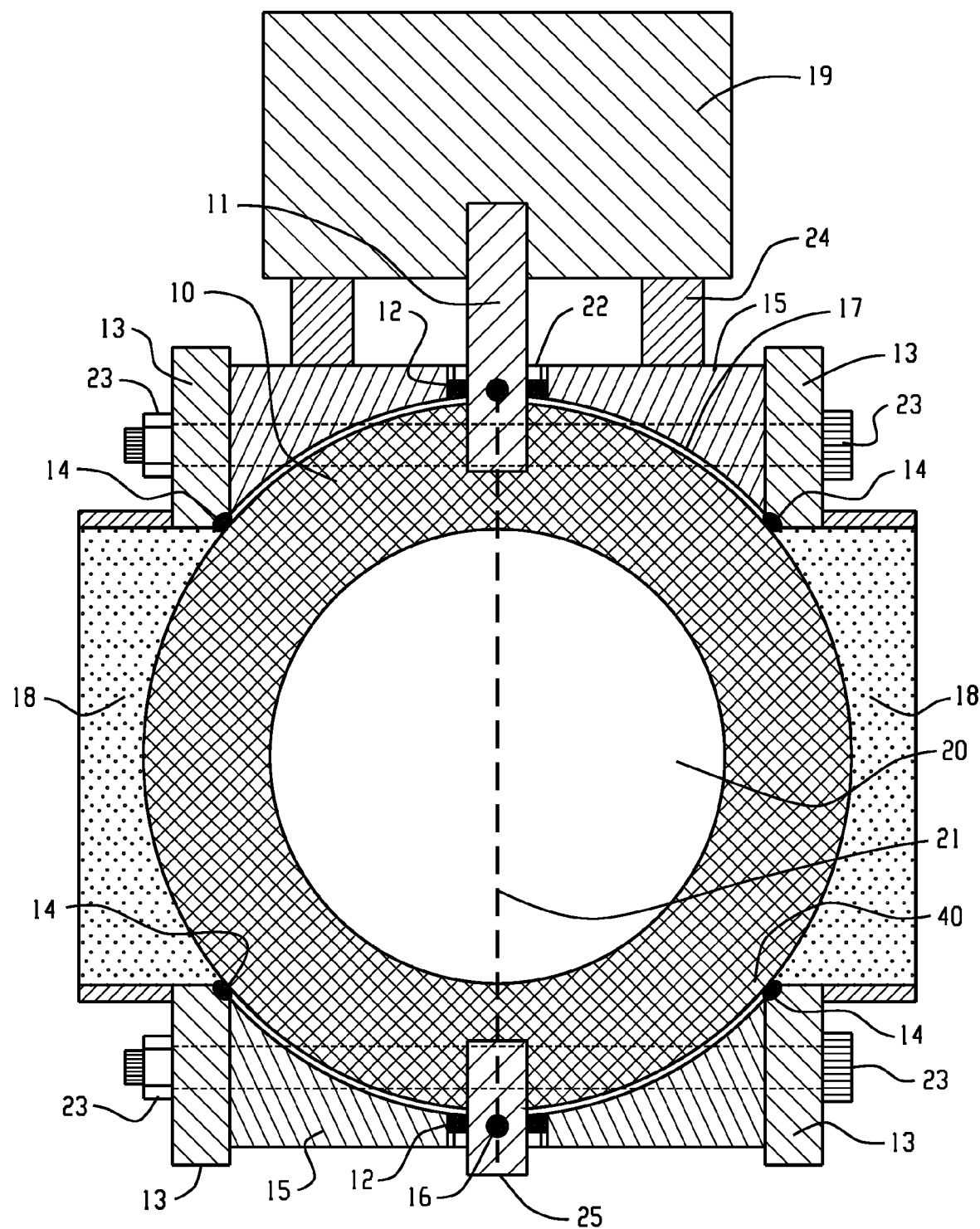
FIG. 1B is front elevation view of the first version of the subject shutter valve in the closed position.

Referring now to FIGS. 1A and 1B, these figures show a front elevational view of a first version of the shutter valve according to the subject disclosure. FIG. 1A shows the valve in the open position. FIG. 1B shows the valve in the closed position. The valve includes a valve body 15 and end caps 13. The end caps 13 are biased against the valve body 15 via connectors 23. Any suitable connector may be used. As shown in the figure the connectors 23 are a cooperating nuts and bolts. Together the valve body 15 and end caps 13 are referred to herein as the valve housing (unnumbered). The valve housing defines an inlet 30 and an outlet 32.

The valve housing further defines a chamber in which is positioned the valve shutter (or truncated ball) 10. The shutter 10 fits snugly within the housing, but is rotatable within the housing. The shutter or truncated ball 10 includes an aperture passing therethrough called the shutter cavity 20. As shown in FIG. 1A, the shutter cavity 20 is aligned with the inlet 30 and outlet 32 of the valve housing. Thus, in FIG. 1A, the valve is in the open position and product 18 is free to flow through the valve. In FIG. 1B, the shutter or truncated ball 10 has been rotated 90° around the axis/parting seam 21 from the position shown in FIG. 1A. Thus, in FIG. 1B, the viewer is looking into the shutter cavity 20 (i.e., the aperture that passes through the truncated ball 10). The shutter or truncated ball 10 now occludes the inlet 30 and outlet 32 of the valve. Thus, in FIG. 1B, the valve is in the closed position and product 18 is blocked from flowing through the valve.

The shutter 10 is positioned within the housing via rotatable valve stems 11 (top stem) and 25 (bottom stem). In practice, only one stem is required and versions of the valve having only one valve stem are explicitly within the scope of the present disclosure. The stems 11 and 25 are rigidly connected to the shutter 10 and are dimensioned and configured to rotate the shutter 10 between the open position (shown in FIG. 1A) and the closed position (shown in FIG. 1B). At least one of the valve stems (top stem 11 in the figures) is operationally connected to an actuator 19. The actuator 19, which can be manual or automatic, is dimensioned and configured to rotate the shutter 10 between the open and closed positions. As used herein, the term "operationally connected" means that the actuator 19 acts to rotate the valve stem 11. The actuator need not be directly attached to the valve stem 11—there may be intervening parts, such as rigid or flexible connectors or extenders situated between the actuator 19 and the valve stem 11. The figures are representative of just one version in which the actuator 19 is directly attached to the valve stem 11. As shown in FIGS. 1A and 1B, the actuator 19 is mounted to the valve body 15 via actuator supports 24.

A pair of shutter valve seals 14 are provided, along with a valve body seal 16. The shutter valve seals 14 and body valve seal can be made from any suitably elastic material, such as natural or synthetic, thermoset or thermoplastic elastomeric polymers. For example, the seals can be made from natural rubber/polyisoprene (NR/IR), polychloroprene rubber (CR, neoprene), acrylonitrile-butadiene rubber (NBR, nitrile), ethylene-propylene diene monomer rubber (EPDM), styrene-butadiene rubber (SBR), fluoroelastomers and perfluoroelastomers (FKM, FFKM, etc.), epichlorohydrin rubber (ECO), polyether block amides (PEBA), chlorosulfonated polyethylene (CSM), ethylene-vinyl acetate (EVA), and the like.

The valve shutter or truncated ball 10 is not a complete sphere. Rather, it is truncated to include parallel faces 41 having opposed ends 42. See FIG. 2B. A novel feature of the valve disclosed herein is that the shutter seals 14 are dimensioned and configured to define (in conjunction with the opposed ends 42 of the valve shutter 10, the endcaps 13, and the valve body 15) an annular cavity 17 that is accessible via gap 40 to product 18 flowing through the shutter valve when it is in the open position. When in the open position as shown in FIG. 1A, product 18 enters and flows through the annular cavity 17 via gaps 40 defined between the shutter seals 14 and the and the opposed ends 42 of the parallel faces 41 of the shutter valve 10.

However, when the shutter valve 10 is rotated to the closed position, as shown in FIG. 1B, the parallel faces 41 and opposed ends of the shutter valve 10 are no longer juxtaposed to the shutter seals 14. Thus, in the closed position, the spherical surface of the shutter valve 10 is biased against the shutter seal 14. Thus, in the closed position, product 18 is no longer able to enter the annular cavity 17. The valve is closed in earnest and no product 18 flow through either the inlet 30, outlet 32, or annular cavity 17.

This feature enables the valve to be cleaned-in-place very easily and very thoroughly. When a system including one or more valves disclosed herein is to be cleaned, an appropriate cleaning solution is introduced into the system (in place of product 18), the valves are opened, and the cleaning solution is then pumped through the system. Because the cleaning solution can enter the annular cavity 17 as easily as can product 18, the valve is thoroughly cleaned-in-place, without requiring disassembly of any sort.

A stem seal 12 is held in place by stem bushing 22 to prevent either product 18 or cleaning solution from leaking around the valve stem 11.

A parting seam 21 is shown in broken line in FIGS. 1A and 1B. For ease of manufacturing the valve disclosed herein, it is preferred, but not required that the valve shutter 10 be fabricated in two pieces and joined in the center at the parting seam 21.

Figure 2A:
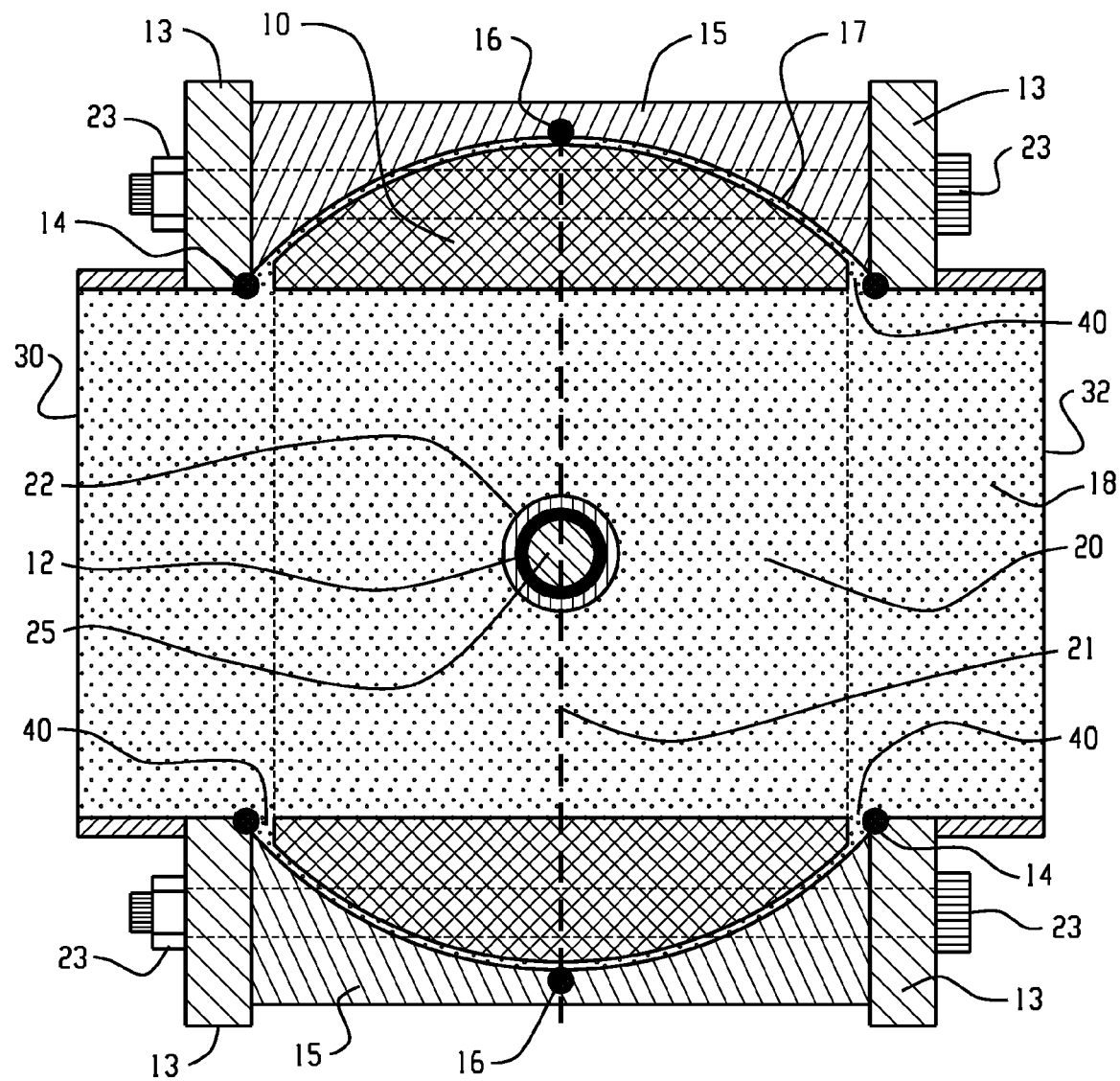
FIG. 2A is a bottom plan view of the first version of the subject shutter valve in the open position.
Figure 2B:
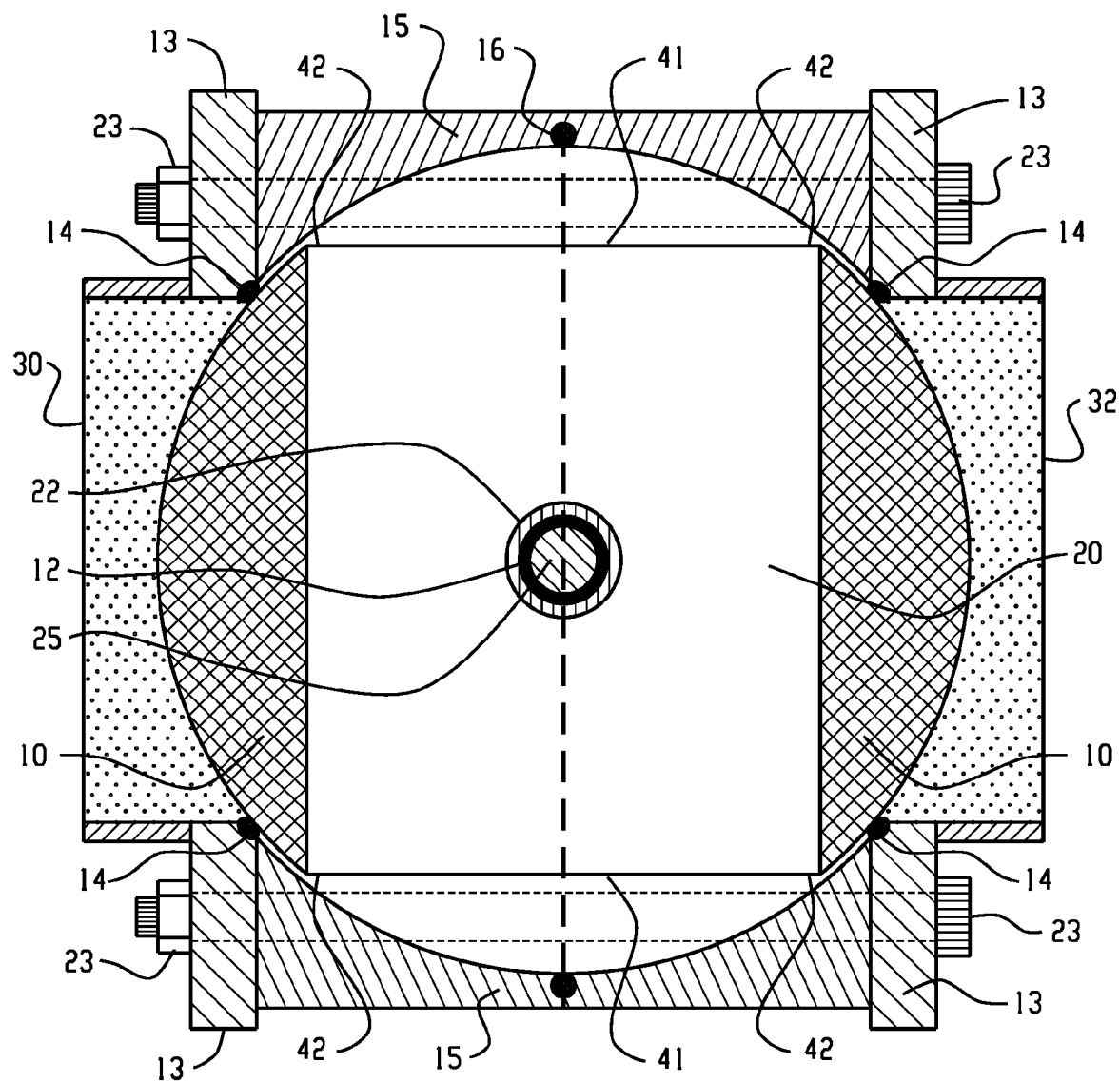
FIG. 2B is a bottom plan view of the first version of the subject shutter valve in the closed position.

FIGS. 2A and 2B are analogous to FIGS. 1A and 1B, but are bottom plan views-looking up through bottom stem 25. FIG. 2A shows the valve in the open position; FIG. 2B shows the valve in the closed position. In the center of each figure can be seen the lower valve stem 25, surrounded by the stem seal 12 and stem bushing 22. As shown in FIG. 2A, product 18 flows through the valve and through gap 40 and into annular cavity 17. Similarly, as shown in FIG. 2B, which shows the valve in the closed position, when closed the outer surface of the valve shutter 10 is urged against shutter seal 14, thereby sealing off access to the annular cavity 17.

Figure 3A:
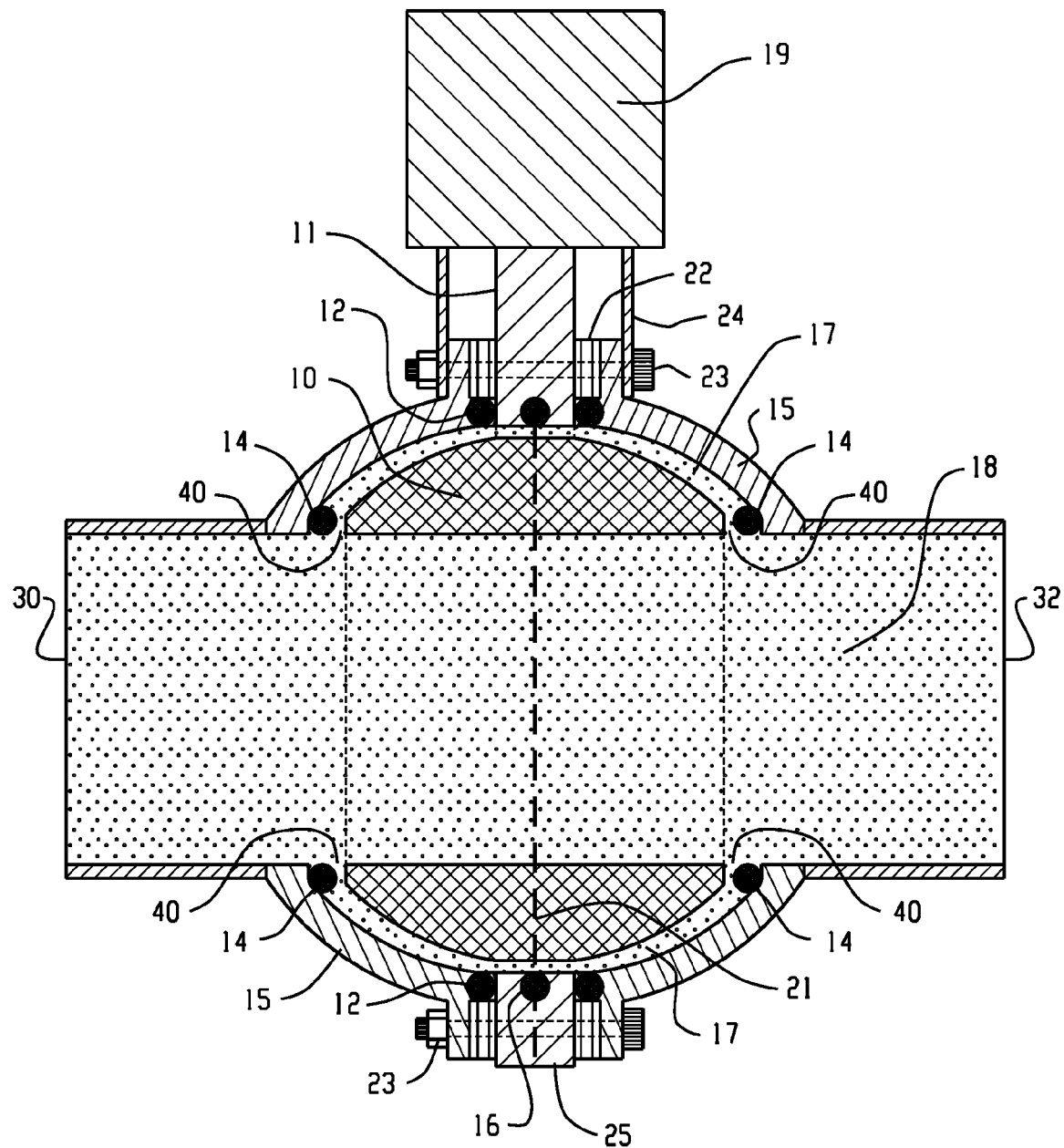
FIG. 3A is front elevation view of a second version of the subject shutter valve in the open position.
Figure 3B:
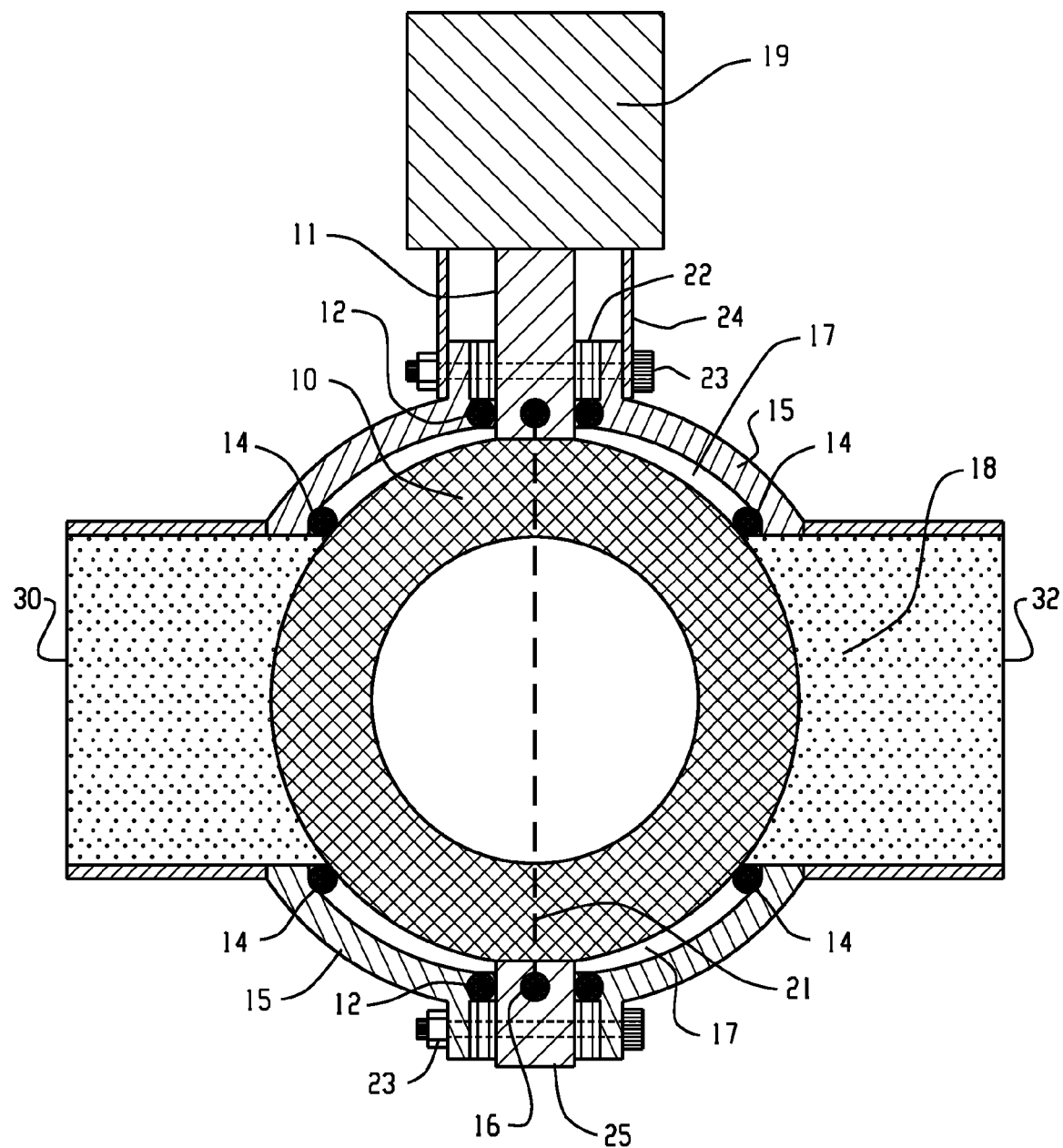
FIG. 3B is front elevation view of the second version of the subject shutter valve in the closed position.
Figure 4A:
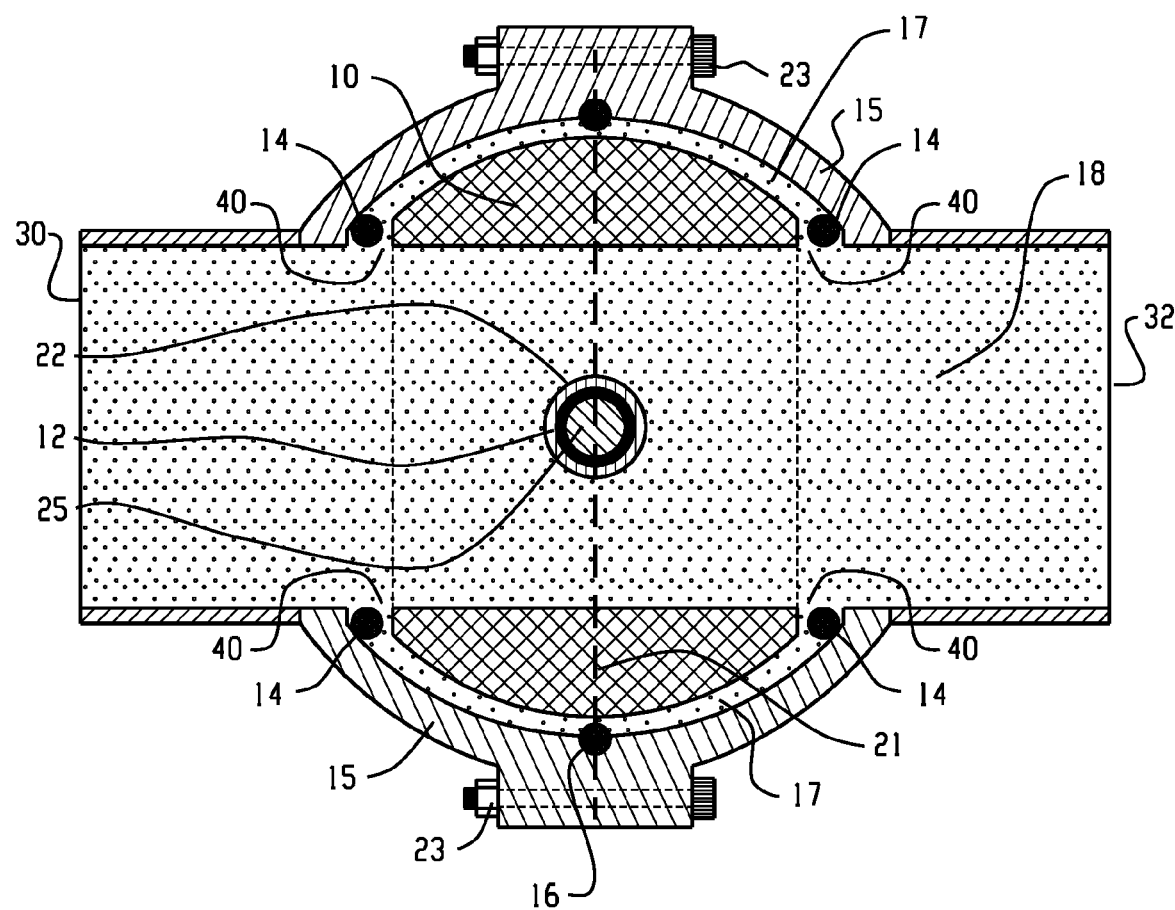
FIG. 4A is a bottom plan view of the second version of the subject shutter valve in the open position.
Figure 4B:
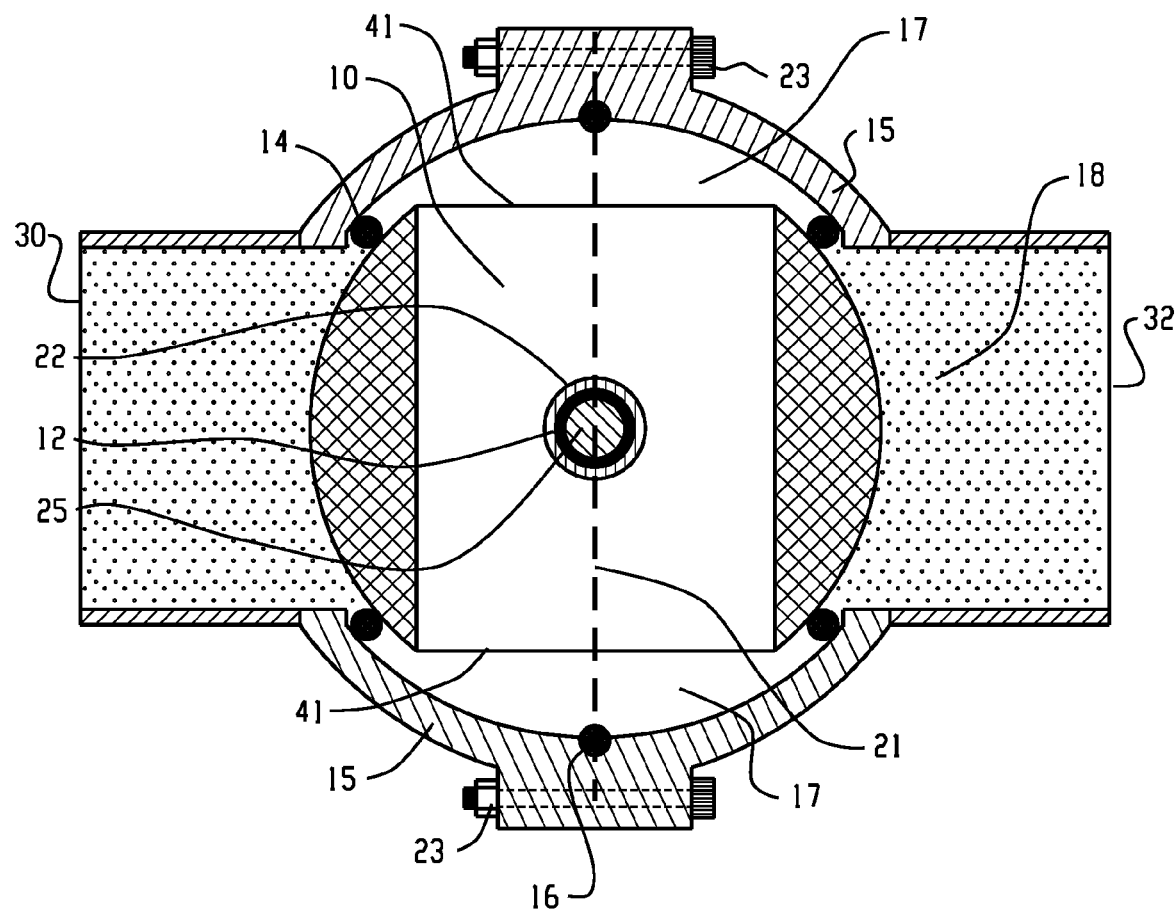
FIG. 4B is a bottom plan view of the second version of the subject shutter valve in the closed position.

FIGS. 3A, 3B, 4A, and 4B show another version of the valve. In the same fashion as FIGS. 1A, 1B, 2A, and 2B, FIG. 3A shows a front elevation of the valve in the open position. FIG. 3B shows the same front elevation, but with the valve in the closed position. FIG. 4A, shows a bottom plan view of the valve in the open position; FIG. 4B shows a bottom plan view of the valve in the closed position.

In this second version of the valve, rather than having a valve body 15 and end caps 13 as in the first version, the second version has two mating valve bodies 15, with cooperating shoulders 15' to connect the two valve bodies 15 together using cooperating fasteners 23. As in the first version, the fasteners 23 are depicted as mating bolts and nuts.

Again, a valve actuator 19 is operationally connected to a valve stem 11. In FIGS. 3A and 3B, the valve shutter 10 again as two valve stems—an upper valve stem 11 (operationally connected to the actuator 19) and a lower valve stem 25.

Product 18 moves through the valve and the annular cavity 17 when the valve is open (FIGS. 3A and 4A) and is blocked from moving through the valve and the annular cavity 17 when the valve is in the closed position (FIGS. 3B and 4B).

Again, stem seals 12 and stem bushings 25 prevent product 18 from leaking past the valve stems 11 and 25 when the valve shutter rotated back and forth between the open and closed positions.

As is seen in FIG. 3A, the annular channel 17 is accessible via gaps 40 when the valve is in the open position. In FIG. 3B, though, which depicts the valve in the closed position, the shutter seals 14 are biased against the valve shutter 10 and close off access to the annular channel 17.

Figure 5:
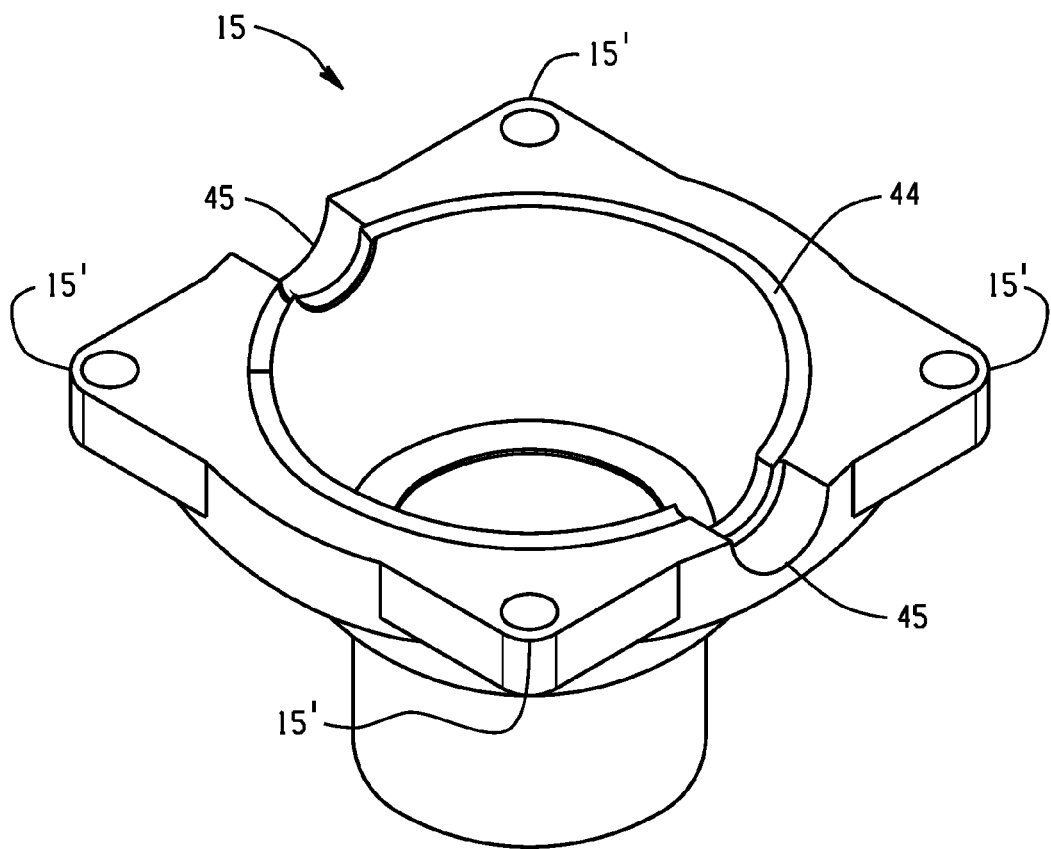
FIG. 5 is a perspective rendering of one half of the valve body 15 of the second version of the valve disclosed herein.

FIG. 5 is a perspective view, in isolation, of one half of the valve body 15, showing shoulders 15' having apertures passing therethrough for the assembly bolts (not shown). A race 44 is provided for a cooperating seal or gasket (not shown) to ensure a liquid tight fit between the two valve bodies 15 when they are joined. Semi-circular grooves 45 are identified. When two valve bodies 15 are joined together to define the valve housing, the grooves 45 in each half define an aperture through the valve housing for the upper (11) and lower (25) valve stems.

Figure 6:
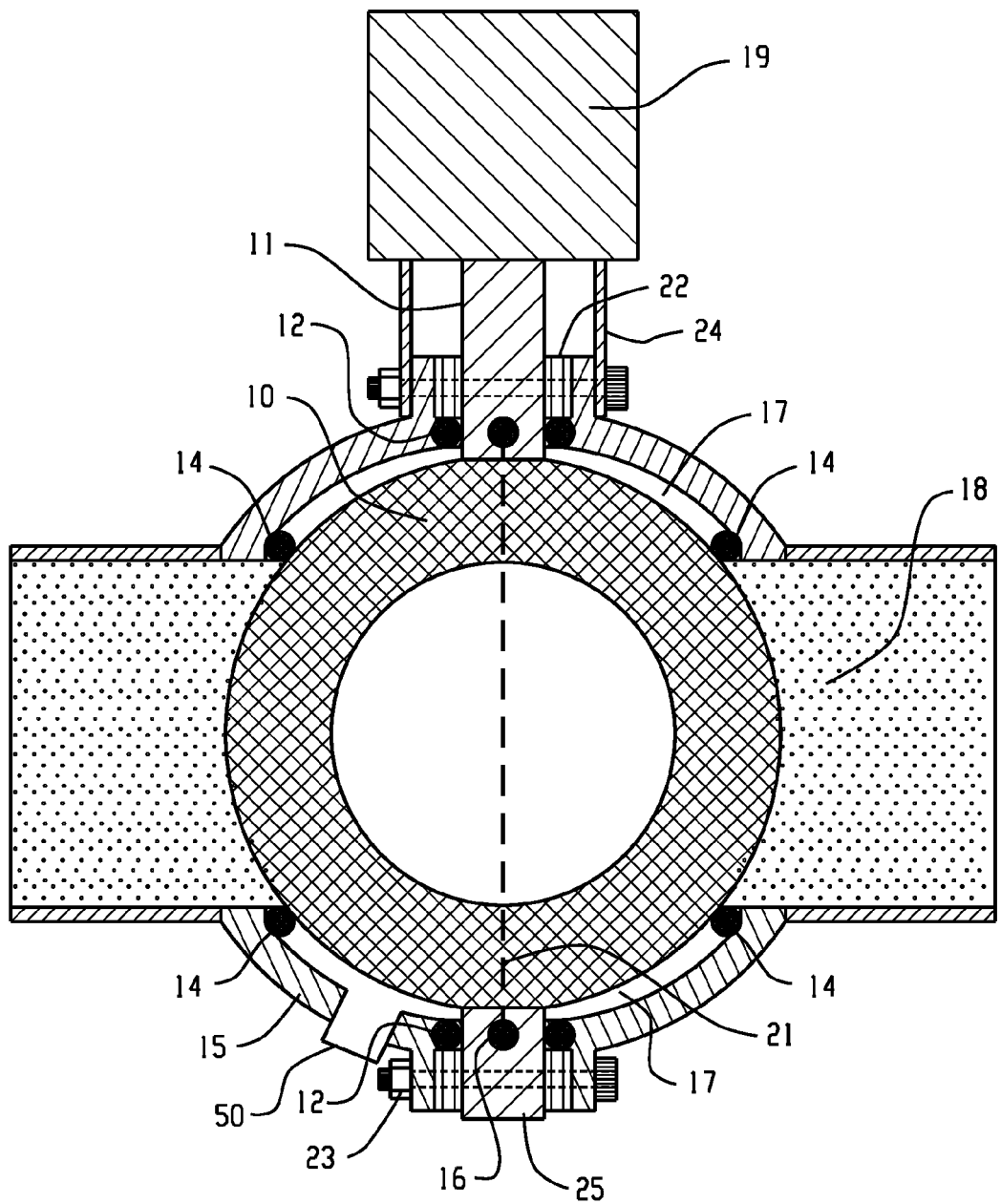
FIG. 6 is front elevation view of a third version of the subject shutter valve in the closed position and including a leak detection or "block and bleed" valve 50 in the body 15.

FIG. 6 is a front elevation view of yet another version of the disclosed valve in which the valve body includes or has defined therein a leak detection or block and bleed valve 50. The valve 50 is movable between an open position and a closed position. In the open position, annular cavity 17 is open to atmospheric pressure. In the open position, the block and bleed valve can be used to detect leaks around shutter seal 14. It also allows cavity 17 to be vented during cleaning operations.

The invention claimed is:

1. A valve comprising:
   a bilaterally symmetrical housing defining a chamber having an inlet and an outlet, wherein the housing comprises two valve bodies operationally connected in face-to-face orientation to define the chamber;
   a valve shutter defining an aperture passing therethrough and having an outer surface, wherein the valve shutter is disposed within the chamber of the housing and is rotationally movable between a first, open position wherein a product can enter the inlet and exit the outlet, and a second, closed position wherein the product cannot enter the inlet or exit the outlet, wherein the valve shutter is rotationally affixed within the chamber of the housing by at least one valve stem attached to the valve shutter; and
   at least one shutter seal disposed between the outer surface of the valve shutter and the housing, such that together the shutter seal, the outer surface of the valve shutter, and the housing define a cavity that is accessible to the product passing through the valve when the valve shutter is in the first, open position, and is inaccessible to the product when the valve shutter is in the second, closed position;
   wherein the valve shutter is dimensioned and configured such that when in the open position, the shutter seal does not make contact with the valve shutter; and
   wherein the valve shutter is in the shape of a truncated sphere having two, parallel spherical caps removed, thereby defining two parallel faces, and defines an aperture passing through the two parallel faces.

2. The shutter valve of claim 1, wherein the valve shutter is rotationally affixed within the chamber of the housing by two valve stems attached to the valve shutter.

3. The shutter valve of claim 1, wherein the at least one valve stem extends through an aperture in the housing and further comprises at least one corresponding stem seal and cooperating stem bushing disposed around the at least one valve stem.

4. The shutter valve of claim 1, wherein the aperture of the shutter approximates the diameter of the inlet and outlet.

5. The shutter valve of claim 4, wherein the valve shutter is rotationally affixed within the chamber of the housing by two valve stems attached to the valve shutter.

6. The shutter valve of claim 4, wherein the at least one valve stem extends through an aperture in the housing and further comprises at least one corresponding stem seal and cooperating stem bushing disposed around the at least one valve stem.

7. The shutter valve of claim 1, wherein when the valve shutter is in the first, open position, the two parallel faces do not contact the at least one shutter seal.

8. The shutter valve of claim 1, wherein when the valve shutter is in the second, closed position, the outer surface of the valve shutter is urged against and defines a liquid tight seal against the at least one shutter seal.

9. The shutter valve of claim 1, wherein the two valve bodies are bilaterally symmetrical.

* * * * *